United States Patent
Johnson et al.

[15] 3,699,440
[45] Oct. 17, 1972

[54] ANALYZER FOR SUCCESSIVELY TESTING THE CONTROL CIRCUITS OF A CONTROL PANEL

[72] Inventors: Martin L. Johnson, 7521 Cherokee Road, Richmond, Va. 23225; Richard L. Leclercq, 532 Longstreet Avenue, Brielle, N.J. 08730

[22] Filed: Oct. 19, 1970

[21] Appl. No.: 81,976

[52] U.S. Cl. .............324/73, 340/213 R, 340/248 E
[51] Int. Cl. ....G08b 19/00, G01r 31/00, G01r 15/12
[58] Field of Search.......324/51, 73; 340/248 E, 213; 431/13–15

[56] References Cited

UNITED STATES PATENTS

| | | |
|---|---|---|
| 2,696,605 | 12/1954 | Knickerbocker.....324/73 R X |
| 2,806,993 | 9/1957 | Matousek......................324/51 |
| 2,858,507 | 10/1958 | Liautaud et al..........324/51 X |
| 3,103,808 | 9/1963 | Eichelberger............324/51 X |
| 3,305,772 | 2/1967 | Earnhart......................324/51 |
| 3,417,326 | 12/1968 | Harris..........................324/51 |
| 3,543,111 | 11/1970 | Harris et al. .............324/51 X |

Primary Examiner—Gerard R. Strecker
Attorney—Shlesinger, Arkwright & Garvey

[57] ABSTRACT

Plural indicator circuits which correspond and are connected to control circuits of a control panel are activated and de-activated as the control panel proceeds through its control sequence, and special interconnected control circuits within the unit successively activate and de-activate the indicator circuits to show the control panel circuit which failed.

18 Claims, 1 Drawing Figure

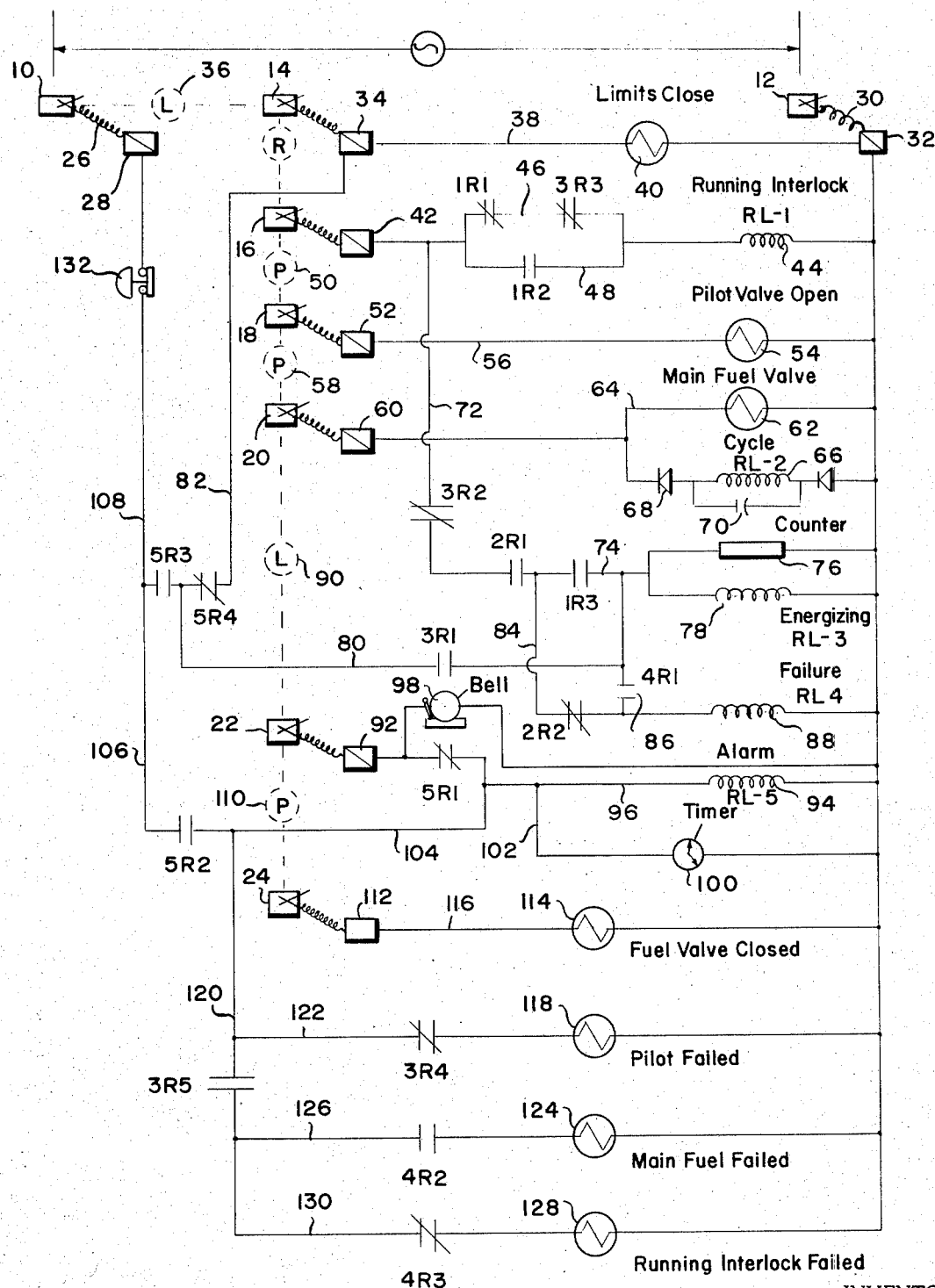

ANALYZER FOR SUCCESSIVELY TESTING THE CONTROL CIRCUITS OF A CONTROL PANEL

SUMMARY OF THE INVENTION

This invention relates to a unit which monitors the operation of a sequentially operable unit through its control panel.

The increasing use of control panels for different assemblies, which have automatic shut-down features, has solved the problem of controlling failure, but has compounded the problem of determining exactly what caused the failure. The control panels using automatic shut-down apparatus, return to a zero operating position upon failure, leaving the operator of the unit uncertain as to exactly what particular portion of the controlled unit caused the failure. This problem is growing larger with the increased use of such panels, and increasingly complex equipment and controls which use increasingly more sophisticated control and shut-down circuits.

Accordingly, it is one of the principal objects of this invention to provide a unit which will monitor and record exactly which component of the controlled unit caused a failure and subsequent shut-down by the control panel.

In many of the complex multi-component assemblies controlled by a shut-down safety system it is extremely difficult to determine which assembly failed because of the automatic shut-down equipment, even when the unit is being observed. An example of this is a momentary erratic failure pattern of one of the assemblies which causes shut-down on only some occasions.

The present invention solves this problem by providing a unit which has the necessary follower and indicator circuits which follow the sequential operation of the automatic controls and immediately pinpoints failure.

Accordingly, it is the principal object of this invention to provide a unit which will indicate the exact type of failure in complex automatically controlled equipment.

One of the advantages of the unit contemplated by this invention is its portability, in that the unit itself can be carried from installation to installation and a tap immediately made on the control panel of that installation, thus obviating the need for special permanent analyzing equipment and costly hookups to the control panel.

A further advantage of this invention is the provision of special indicator circuits which are activated in sequential order and will immediately show the component assembly which failed.

A still further advantage of the unit provided by this invention is the provision of a counter and timer assembly which will accurately show exactly when failure occurred. This information is frequently helpful in determining the exact cause of the failure of the component assembly.

Other advantages and features of this invention will become readily apparent from the following description and claims.

DESCRIPTION OF THE DRAWING

The drawing is a schematic circuit showing the wiring of the analyzer unit and the manner in which it is connected to a given control panel.

The drawing shows the circuitry of the analyzer unit together with the tap points for terminals of a burner control panel. Terminals 10 and 12 represent the power input line terminals of the burner control panel, while terminals 14, 16, 18, 20, 22 and 24 represent special tap points or terminals of the burner control panel.

The control panel circuitry is contained within a separate housing, not shown, and a tap of appropriate control circuit points of the separate control panel circuits is made by a plurality of clip-on wires attached to the input terminals of the analyzer unit. For example, the B+ terminal input power is supplied through clip-on wire assembly 26 to the analyzer terminal 28, and a similar type of clip-on wire assembly 30 connects the ground terminal 32 of the analyzer unit to the ground terminal 12 of the control panel. As indicated in the drawing these clip-on assemblies are used between all of the corresponding input terminals of the analyzer unit and the tap points or terminals of the burner control panel.

The limits close terminal 34 is connected through its clip-on wire to the limits close terminal or tap 14 of the control panel. The terminal 14 is activated and power supplied thereto from the power input terminal through the operating, starting and other limit controls 36 (shown as a dotted circle) which initiate the starting and run cycle of the control panel. When this occurs the power is supplied from terminal 34 through line 38 to light the limits close bulb 40. The lighting of this bulb would indicate that the line voltage thermostat and the limit and operating switches, such as the fuel pressure switch, were ready for operation of the burner.

The control panel unit would then proceed through the running interlock controls 41 to activate control panel terminal 16, the connection between terminals 14 and 16 being schematically shown by the dotted line and circled "R." In a burner control panel these controls would activate terminal 16 only if there was air flow to the burner and the main fuel valve was closed. When power is supplied to terminal 16 of the control panel, power flows through the clip-on lead to terminal 42 of the analyzer and through the coil 44 of the running interlock relay through branch circuit 46 which contains the normally closed 1R1 and 3R3 relay contacts. As soon as the running interlock relay, RL-1 is activated its normally open contacts 1R2 in branch circuit 48 are closed locking in the running interlock relay RL1. The control panel unit, after activation of its running interlock terminal 16 proceeds through the programmer generally indicated at 50 to the activation of the pilot valve control circuit and terminal 18 of the panel. The analyzer terminal 52 will be supplied with power lighting the pilot valve open bulb 54 of branch line 56 which connects terminal 52 to the ground terminal 32.

Assuming that there is no failure up to this point in the burner unit, the programmer circuitry generally indicated at 58 will result in supplying of power to the main fuel valve terminal 20. The analyzer main fuel valve terminal 60 will have power supplied thereto and the main fuel valve bulb 62 connected in circuit 64 will be lit. Simultaneously, the cycle relay RL-2 will have power pass through its coil 66 to close its contacts. The diodes, such as 68 and the capacitor 70 provide a delay for this relay.

At this point, the burner will have progressed to the main firing of the unit having progressively moved through the limits close, running interlock, pilot activation, and main burner phases of its operation, and should be operating smoothly.

As soon as the main fuel valve light and the cycle relay coil are powered, line current is supplied through lines 72 and 74 to activate the counter 76 to show that one more burner sequence has been completed.

The counter 76 and the energizing relay RL3 are activated simultaneously. The initial current for these elements is supplied through line 72, normally closed contacts 3R2, and the immediately prior closed normally open contacts 2R1 and 1R3 of the running interlock RL1 and cycle RL2 relays respectively. As current is supplied through the coil 78 of the energizing relay RL3 the normally open contacts 3R1 in alternate power line 80 are closed and current is supplied to the counter and energizing relay RL3 through this line, the normally closed contacts 5R4 and line 82 from the limits close terminal 34, while the running interlock power supply line 72 is disconnected with the opening of normally closed energizing relay contacts 3R2 in line 72. Contacts 3R1 lock in the coil 78 of the energizing relay RL3.

The energizing relay has five sets of contacts in other circuits. In addition to contacts 3R1 and 3R2 in lines 80 and 72, there is a set of normally closed contacts 3R3 in branch 46 of the running interlock circuit, normally closed contacts 3R4 in the pilot failed indicator circuit and normally open contacts 3R5 in the line supply circuit to the main fuel failed and the running interlock failed indicator circuits.

The running interlock power line 72 contains two normally open sets of contacts, 2R1 and 1R3 which must be closed by a current passing through the cycle relay RL2 and running interlock relay RL1 coils respectively before the counter 76 and energizing relay 78 can be activated.

If there is a failure of the main fuel valve in the panel, power will be cut off from terminal 60 and the coil 66 of the cycle relay RL2 will be dropped out after a short time delay because of capacitor 70. This will close the normally closed contacts 2R2 and power will be supplied through the failure relay supply line 84 to coil 88 of failure relay RL4. When this occurs normally open contacts 4R1 in line 86 are closed locking in the coil 88 of the failure relay through line 80 and the previously closed contacts 3R1.

In a control panel for a burner unit, terminals 10 and 12 would supply power to energize the tube heaters. The limit controls and operating controls are schematically represented by the circled "L" 36 between terminals 10 and 14 and only when these controls indicate satisfactory operable condition is the limits terminal 14 activated.

The circled "R" between the limit terminal 14 and the running interlock terminal 16 indicates that only when the required conditions are satisfied, such as the operation of the burner and timer motor and correct position of the running airflow switch, will the control panel running interlock terminal or line be powered.

The lock-out controls 90 of the control panel will activate the control panel along terminal 22. This will power analyzer alarm terminal 92 supplying power to the coil 94 of alarm relay RL5 through line 96 and normally closed contact 5R1.

The bell 98 will ring indicating shutdown, and timer 100 will be powered through line 102.

When the alarm relay RL5 is activated, the normally closed contacts 5R1 are opened, but the line 104 immediately provides power for the alarm relay coil 94 and the timer 100 through the normally open contacts 5R2 which will be closed as soon as the coil 94 is activated, so that power is provided from the positive power terminal 28 of the analyzer through lines 106 and 108.

When this occurs the control panel for the burner will return to zero setting and the programmer circuitry 110 will supply power to a terminal 24 of the panel. Fuel valve indicator terminal 112 is connected to terminal 24 and the fuel valve closed bulb 114 in circuit 116 is immediately lighted.

There are four sets of contacts controlled by the alarm relay RL5. The normally closed contacts 5R1 are opened as soon as current passes through the alarm relay coil 94, this connecting that power source to the relay coil and to the timer, but the secondary power line is immediately supplied with current through the simultaneously closed normally open contacts 5R2 in line 106 to supply power to the alarm relay coil 94 and the timer 100.

The main power supply line 108 is also connected to line 80 through normally open contacts 5R3, while the normally closed contacts 5R4 are opened disconnecting line 80 from the limits close terminal line 82.

The pilot failed indicator light 118 is activated through lines 120 and 122. The normally closed 3R4 contacts of the energizing relay control whether bulb 118 lights when power is supplied to line 120 through line 106 and contacts 5R2.

The main fuel failed indicator light 124 is supplied with power through line 120 and 126, the supplying of current being dependent upon closing of the normally open sets of contacts 3R5 and 4R2 of the energizing and failure relays respectively.

The running interlock failure light 128 is supplied with current through lines 120 and 130 and relay contacts 3R5 and 4R3 respectively contained in those lines.

The reset button 132 in line 108 immediately below terminal 28 deactivates the alarm circuit and failure indicator lights when it is depressed to its open position by cutting off the current to coil 94 of the alarm relay RL5, opening its normally open sets of contacts 5R2 and 5R3. The normally closed contacts 5R1 and 5R4 return to their original position connecting terminal 92 with line 96 and line 82 with line 80 respectively.

OPERATION

The description above, discussed the operation of the analyzer unit in conjunction with the control panel where there was no failure and the control panel proceeded smoothly through the operation phases of limits close checking, running interlock checking, pilot valve operation, and main fuel valve operation. At the time of main fuel valve operation the counter and energizing relay are brought into operation and the circuit is set for subsequent failure recording.

In the instance where there is a failure in the limits controls 36 of the control panel there would be no current supplied to terminals 14 and 34 and the limits close bulb 40 would not light.

If the limit controls are in order the control panel will energize terminal 14 and the limits close bulb 40 will light.

Should failure of the running interlock occur after the panel has successfully cycled through the limits close phase of the cycle, the control panel will proceed no further, and the limits close light 40 will remain lit.

In the event that there is no trouble in the running interlock controls, terminal 16 and terminal 42 will be energized activating the running interlock relay RL1 through coil 44 and supplying current to the running interlock line 72. At this moment, the normally open contacts 1R3 of the running interlock relay, contained in line 74 are closed, so that the only open contacts are 2R1 of the cycle relay.

If a pilot fails or is not detected after the control panel energizes running interlock terminals 16, the lock-out switch of the programmer will be tripped energizing the alarm terminal 22, which will activate relay RL5 through coil 94, supplying current through lines 108, 106, 120 and 122 to light the pilot failed bulb 118. When the alarm circuit is energized the alarm relay will close normally open contacts 5R2. Normally closed contacts 3R4 in line 122 will remain closed, since the energizing relay RL3 will not have been activated. The limits close light will remain on.

Should the programmer controls 50 be in order, the terminals 18 and 52 will be energized, energizing line 56 to light the pilot valve open bulb 54.

If there is failure of the pilot subsequent to lighting of the pilot valve open bulb 54 the same sequence will occur, and in addition the programmer will de-energize terminal 18 turning off the pilot valve open bulb 54. The programmer will return to the zero or initial position and de-energize the running interlock terminal 16, and consequently the running interlock relay RL1.

If the pilot of the burner lights and is detected the programmer controls 58 will proceed to energize the control panel main fuel valve, lighting main fuel valve bulb 62 and activating the cycle relay RL2. At this point, the normally open relay in the running interlock supply line 72 will close supplying current to the counter and to the coils 78 of the energizing relay RL3 through previously closed normally open contacts 1R3 of the running interlock RL1.

At this point the counter registers one count for a cycle. No count is registered prior to activation of the main fuel valve and the cycle relay RL2.

At this point the energizing relay RL3 is locked in and the current supply to the energizing relay coil 78 is shifted from the running interlock line 72 to the limits close lines 82 and 80 when the normally open contacts 3R1 of the energizing relay are closed. Normally closed contacts 3R2 in the running interlock line are opened when the coil 78 of the energizing relay receives current. The programmer of the control panel will proceed to the end of the starting cycle and stop in the run position at this point.

When the energizing relay RL3 is activated, the normally closed contacts 3R4 in line 122 of the pilot failure circuit are opened, precluding this circuit from being activated when the alarm terminal is energized. Simultaneously, normally open contacts 3R5 in line 120 are closed providing a circuit to the main fuel failure indicator circuit 126 and the running interlock failure circuit 130.

If there is failure in the burner unit, the programmer will de-energize the main fuel valve terminal 20 cutting off current to the main fuel valve terminal 60 of the analyzer unit, shutting off the main fuel valve bulb 62 and cutting off current to the cycle relay coil 66. The program lock-out switch of the control panel will trip the alarm terminal 22, supplying current to alarm terminal 92 of the analyzer which rings the bell 98, starts the timer 100 running and activates the alarm relay RL5 through its coil 94. The closing of contacts 5R2 in line 106 supplies current through the line 120 and the now closed contacts 3R5 of the energizing relay to line 126. Normally open contacts 4R2 in line 126 will be closed when this failure occurs, thereby lighting main fuel failed bulb 124. When the main fuel valve terminal is disconnected dropping out cycle relay RL2, the normally closed contacts 2R2 in line 84 close, supplying current to coil 88 to activate the failure relay RL4. When this occurs the failure relay RL4 will be locked in by current supplied through line 86 and the now closed normally open contacts 4R1.

The programmer of the control panel will return to zero or initial position de-energizing the running interlock terminal and the running interlock relay. The limits close light 40 will remain on.

If the running interlock causes failure after the main fuel valve terminal is energized, either momentarily or prolonged, the running interlock relay RL1 will be de-energized opening contacts 1R3 which will prevent energizing of the failure relay RL4 through line 84 and contacts 2R2 of the cycle relay. The delay circuit in parallel with the cycle relay coil 66 will prevent the rapid closing of normally closed contacts 2R2 on de-activation of the cycle relay, permitting the circuit to be broken through opening of contacts 1R3 before lock-in of the failure relay through normally open contacts 4R1. The energizing relay RL3 will still have power supplied to its coil 78 and the contacts 3R5 of this relay in line 120 will permit current to flow from lines 106 and 108 through line 120 to line 130 and through the normally closed contacts 4R3 to light the running interlock failure bulb 128.

It will be seen that the circuits of the analyzer follow along with the program control panel and that if there is any change from normal state of either the limits, the interlock controls, the pilot, the main fuel interlock, and airflow, either before or after the main fuel valve is opened, the analyzer will pick up the failure, pinpointing the trouble by one of the indicator circuits. The analyzer power circuit is connected to the line power terminals of the control panel so that in such cases the shutdown of the control panel will not in any way affect the power supply to the analyzer unit.

With regard to the alarm circuit, it will be noted that as soon as it is activated the power supply from the main terminal is connected directly to the indicator circuits and to the energizing and failure relays.

The analyzer unit follows along with the various control circuits of the control panel. At the point that there is a failure in a burner assembly which affects the control panel circuits the corresponding circuit in the analyzer unit is affected to record failure.

The counter will record the cycle on which, or after which, the failure occurred, and the timer which begins with the activation of the alarm circuit will fix the exact time of failure.

The analyzer unit can be carried by the field service man from one installation to another. It can readily be connected to the control panel of any given unit through its clip-on terminal leads, eliminating the need for any field wiring.

This type of unit having various interconnected control and indicator light circuits can be used with any type of control panel, although the specific example illustrated is for a burner control assembly.

While the invention has been described in connection with different embodiments thereof it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

What we claim is:

1. A control panel sequence analyzer, including:
   a. a portable housing having a plurality of separate power input terminals each having means for separate connection to one of a group of inter-related sequentially operated control panel circuits which are activated when currents are passed therethrough,
   b. a plurality of separate follower circuits disposed within the portable housing, each circuit connected to one power input terminal and responsive to currents passed through a control panel circuit,
   c. at least several of the follower circuits including indicator means for showing whether the control panel circuit to which it is connected has been activated,
   d. at least several of the follower circuits having control elements therein,
   e. a set of power main input terminals on the portable housing which have means for directly connecting them to the control panel power main terminals,
   f. a power main circuit connected to the power main input terminals and including means for activation thereof in the event of a failure in the control panel,
   g. a plurality of separate failure indicator circuits connected to the main power circuit and having indicator means for showing failure of a given circuit,
   h. a plurality of electrically actuated switching devices each having a control responsive actuating element, and a switch element,
   i. the actuating element of a given switching device being the control element in one of the follower circuits,
   j. the switch element of such switching device being disposed in the failure indicator circuit of a control panel circuit which is sequentially related to the control panel circuit to which the follower control circuit containing the actuating element is connected.

2. The control panel sequence analyzer of claim 1, wherein:
   a. quick connect power lead means is connected to each of the power input terminals for rapid and immediate connection of the terminals to corresponding points in a control panel.

3. The control panel sequence analyzer of claim 1, wherein:
   a. the electrically actuated switching devices are relays, the coils thereof being the actuating elements and the contacts being the switch elements.

4. The control panel sequence analyzer of claim 1, wherein:
   a. one of the follower circuits has an actuating element of one switching device and a set of switch elements of a second switching device,
   b. the actuating elements of the second switching device being disposed in another follower circuit.

5. The control panel sequence analyzer of claim 1, wherein:
   a. one of the follower circuits is a failure control circuit having an actuating element of a switching device,
   b. the switch element thereof is the said means for actuating the power main circuit.

6. The control panel sequence analyzer as set forth in claim 1, wherein:
   a. a timer is connected to the main power circuit and is activated simultaneously therewith.

7. The control panel sequence analyzer of claim 1, wherein:
   a. one of the follower circuits includes an actuating element and a "lock-in" network.

8. The control panel sequence analyzer of claim 1, wherein:
   a. one of the follower circuits includes a counter and relay coil in series with at least two switch elements of separate switching devices each of which have their respective actuating element in different follower circuits.

9. The control panel sequence analyzer of claim 1, wherein:
   a. at least one of the follower circuits contains both an indicator light and an actuating element.

10. A control panel sequence analyzer, comprising:
    a. a portable housing having a main power supply means for connection to the permanent power source of a control panel,
    b. a plurality of individual secondary power supply means on the housing each including separate connection means for electrical connection to one of a plurality of individual sequentially activated control panel circuits through which current passes when such circuits are activated,
    c. at least one indicator circuit connected to one of the secondary power supply means for indicating the state of the control panel circuit to which it is electrically connected,
    d. an alarm circuit within the housing and connected to the individual secondary power supply means activated when failure is detected in the control panel, e. a main power supply circuit in the housing which is connected to the main power supply means and which contains at least one controlled conducting element, f. at least one indicator circuit connected to the main power circuit, g. an electrical control device having its control element connected in circuit and energized with the alarm circuit, and its conducting element being one of said controlled conducting elements in the main power supply circuit, h. the controlled conducting element of the electrical control device being in a normally open state, and closing when the alarm circuit is actuated so that power is supplied to the indicator circuit connected to the main power circuit when failure is detected within the control panel.

11. The control panel sequence analyzer of claim 10, wherein:

a. a control circuit is disposed within the housing and connected to one of the secondary power supply means, b. one of the indicator circuits connected to the main power supply circuit contains an electrical lamp, c. an electrically operated switch has its control element disposed in the control circuit and its switching element disposed in the indicator circuit containing the lamp, whereby the conducting state of the indicating circuit will be dependent upon the state of the control circuit.

12. The control panel sequence analyzer of claim 10, including:

a. a plurality of control circuits each having a relay coil in circuit therewith, b. a master control circuit having at least two sets of relay contacts from different control circuits in circuit therewith, c. the master control circuit having an energizing relay coil in circuit therewith activation of which is dependent upon the condition of the control contacts in the master control circuit, d. a secondary power supply line connected to the master control circuit which bypasses the relay contacts in the master control circuit and contains a normally open set of contacts of the energizing relay of the master control circuit, whereby when the energizing relay is activated, its normally open contacts are closed and an auxiliary supply of power is provided locking in the energizing relay.

13. The control panel sequence analyzer of claim 12, wherein:

a. the energizing relay also has contacts in circuit with a plurality of the second set of indicator circuits.

14. The control panel sequence analyzer of claim 12, including:

a. a counter unit is connected in circuit with the master control circuit

15. The control panel sequence analyzer of claim 12, wherein:

a. the master control circuit is connected to a running interlock circuit of the control panel, b. the secondary power line is connected to a limits close circuit of the control panel.

16. The control panel sequence analyzer of claim 15, wherein:

a. one of said control circuits is a running interlock circuit connected to a running interlock circuit of the control panel and in parallel with the master control circuit.

17. The control panel sequence analyzer of claim 16, wherein:

a. one of said control circuits is a main fuel valve circuit connected to a main fuel valve circuit of the control panel.

18. The control panel sequence analyzer of claim 12, wherein:

a. the alarm circuit is electrically connected to a timer for fixing the time of failure.

* * * * *

UNITED STATES PATENT OFFICE
CERTIFICATE OF CORRECTION

Patent No. 3,699,440   Dated October 17, 1972

Inventor(s) Martin L. Johnson and Richard L. Leclercq

It is certified that error appears in the above-identified patent and that said Letters Patent are hereby corrected as shown below:

Change address of Richard L. Leclercq to:

45 E. 16th Street
    Surf City, New Jersey  08008

Signed and sealed this 6th day of March 1973.

(SEAL)
Attest:

EDWARD M. FLETCHER, JR.
Attesting Officer

ROBERT GOTTSCHALK
Commissioner of Patents